US007602490B2

(12) United States Patent
Inaoka et al.

(10) Patent No.: US 7,602,490 B2
(45) Date of Patent: *Oct. 13, 2009

(54) LIQUID EJECTING HEAD ALIGNMENT APPARATUS AND LIQUID EJECTING HEAD ALIGNMENT METHOD

(75) Inventors: Yasuo Inaoka, Shiojiri (JP); Motonori Okumura, Shiojiri (JP); Mutsuhiko Ota, Matsumoto (JP); Kazutoshi Goto, Matsumoto (JP); Isao Yanagisawa, Chino (JP); Takuma Okamuro, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 11/851,999

(22) Filed: Sep. 7, 2007

(65) Prior Publication Data

US 2008/0062436 A1    Mar. 13, 2008

(30) Foreign Application Priority Data

Sep. 8, 2006    (JP)    ............................. 2006-244571

(51) Int. Cl.
    *G01B 11/00*    (2006.01)
(52) U.S. Cl. ..................................... 356/399
(58) Field of Classification Search ................. 356/614, 356/620, 399–401, 124–127; 382/141–154; 250/559.29, 559.3; 347/19, 54; 359/372–378
    See application file for complete search history.

(56)    References Cited

U.S. PATENT DOCUMENTS 4,549,084 A * 10/1985 Markle ....................... 250/548
5,389,954 A * 2/1995 Inaba et al. .................. 347/258
6,072,915 A * 6/2000 Tanaka ........................ 382/287
6,775,037 B1 * 8/2004 Lee ............................... 359/35
2008/0094441 A1 * 4/2008 Okamuro et al. ............. 347/19

FOREIGN PATENT DOCUMENTS

JP    2002-160376    6/2002
JP    2004-345281    12/2004

* cited by examiner

*Primary Examiner*—Tarifur R. Chowdhury
*Assistant Examiner*—Isiaka O Akanbi
(74) *Attorney, Agent, or Firm*—Workman Nydegger

(57)    ABSTRACT

The invention provides a liquid ejecting head alignment apparatus that is used for positional determination and adhesion of nozzle plates and a fixation member, each of the nozzle plates having nozzle openings through which each of a plurality of liquid ejecting heads ejects liquid and further having alignment marks for positional alignment, the fixation member holding the nozzle-plate side of the plurality of liquid ejecting heads. The liquid ejecting head alignment apparatus according to the invention includes: a mask made of a transparent material, the mask having reference marks each of which is aligned with the corresponding alignment mark; a spacer jig that is provided between the fixation member and the mask in such a manner that the reference marks and the alignment marks are opposed to each other with a space being left therebetween, one surface of the spacer jig being in contact with the fixation member; and a bifocal microscope having an optical axis and two optical systems that shares the optical axis, the optical axis being oriented from a face of the mask that is opposite to the spacer jig side thereof toward the alignment mark via the reference mark and the space, one of the optical systems being capable of focusing on the reference mark, and the other thereof being capable of focusing on the alignment mark.

8 Claims, 9 Drawing Sheets

LIQUID EJECTING HEAD ALIGNMENT APPARATUS AND LIQUID EJECTING HEAD ALIGNMENT METHOD

The entire disclosure of Japanese Patent Application No. 2006-244571, filed Sep. 8, 2007 is expressly incorporated by reference herein.

BACKGROUND

1. Technical Field

The present invention relates to a liquid ejecting head alignment apparatus and a method for alignment thereof. More particularly, the present invention is useful when applied to a high-precision alignment of a liquid ejecting head with an alignment mark printed on a mask made of a transparent material.

2. Related Art

An ink-jet recording apparatus such as an ink-jet printer, a plotter, or the like is provided with ink-jet recording head units. The ink-jet recording head unit has an ink-jet recording head, which discharges ink retained in an ink containing unit such as an ink cartridge, an ink tank, or the like in the form of ink drops. In the following description, such an ink-jet recording head unit may be referred to as "head unit" for simplicity or generalization. The ink-jet recording head has nozzle lines provided in parallel with each other (or one another). Each nozzle line is made of nozzle openings. A cover head is provided to protect the ink-drop-discharge side of the ink-jet recording head. The cover head, which is provided on the ink-drop-discharge surface of the ink-jet recording head, is made up of a window frame portion and sidewall portions. The window frame portion of the cover head has an open window that exposes the nozzle openings. The sidewall portions thereof are formed by bending a cover head material in such a manner that each side thereof extends at a right angle from the window frame portion thereof. Each sidewall portion is bonded to the corresponding side surface of the ink-jet recording head for fixation thereof. An example of such a structure is described and illustrated in, for example, JP-A-2002-160376 (specifically, Page 4, and FIG. 3 thereof).

When bonding a fixation member such as the cover head described above, a holding plate, or the like to a plurality of ink-jet recording heads, each of the ink-jet recording heads is moved with respect to a nozzle plate for positional determination thereof in such a manner that the position of an (each) alignment mark that is provided on the nozzle plate is aligned with a (corresponding) reference mark that is provided on a flat glass mask.

In order to ensure a high precision in such a positional determination, it is necessary to make the distance between the reference mark and the alignment mark as short as possible. As one conventional approach described and illustrated in, for example, JP-A-2004-345281 (specifically, Page 10, and FIG. 3 thereof), alignment is performed with the nozzle plate being in contact with the glass mask.

Disadvantageously, however, if the nozzle plate is in contact with the glass mask, there is a possibility that a foreign object/particle could get jammed between the nozzle plate and the glass mask. In addition thereto, there is a possibility that the surface of the glass mask gets damaged.

Although such a problem will be solved if some space is allocated between the glass mask and the nozzle plate, the existence of a gap therebetween increases a distance between the reference mark and the alignment mark, which adversely affects the precision in positional determination. Specifically, it is necessary to increase the depth of field if a user attempts to observe both the reference mark of the glass mask and the alignment mark of the nozzle plate at the same time by using just a single optical system. However, as the depth of the field becomes greater, it becomes difficult to raise the power of the optical system. This makes it difficult to achieve a high precision in positional determination.

As an alternative approach for observing the reference mark and the alignment mark that are distanced from each other, it is conceivable that, firstly, the reference mark is observed with a focus adjusted on the reference mark, and thereafter, a lens is moved in the optical axial direction so as to observe the alignment mark with a focus adjusted thereon. However, if such a configuration is adopted, since lens move precision directly affects alignment precision, it is difficult to expect positional determination to be carried out with precision higher than a certain level.

It should be noted that the above-identified problems are not unique to alignment performed during production of ink-jet recording head units. That is, the same or similar problems also occur during production of a variety of liquid ejecting head units other than the ink-jet recording head units.

SUMMARY

An advantage of some aspects of the invention is to provide a liquid ejecting head alignment apparatus and a method for alignment thereof that makes it possible to achieve positional determination with a high precision even when a reference mark(s) and an alignment mark(s) are distanced from each other.

In order to address the above-identified problems without any limitation thereto, a first aspect of the invention provides a liquid ejecting head alignment apparatus that is used for positional determination and adhesion of nozzle plates and a fixation member, each of the nozzle plates having nozzle openings through which each of a plurality of liquid ejecting heads ejects liquid and further having alignment marks for positional alignment, the fixation member holding the nozzle-plate side of the plurality of liquid ejecting heads. The liquid ejecting head alignment apparatus according to the first aspect of the invention includes: a mask made of a transparent material, the mask having reference marks each of which is aligned with the corresponding alignment mark; a spacer jig that is provided between the fixation member and the mask in such a manner that the reference marks and the alignment marks are opposed to each other with a space being left therebetween, one surface of the spacer jig being in contact with the fixation member; and a bifocal microscope having an optical axis and two optical systems that shares the optical axis, the optical axis being oriented from a face of the mask that is opposite to the spacer jig side thereof toward the alignment mark via the reference mark and the space, one of the optical systems being capable of focusing on the reference mark, and the other thereof being capable of focusing on the alignment mark. With the configuration described above, since the nozzle plates through which the alignment marks are provided and the mask on which the reference marks are provided never contact each other, it is possible to concurrently observe the reference mark and the alignment mark by means of the bifocal microscope without damaging the surfaces of the nozzle plates and the surface of the mask. Therefore, it is possible to perform positional determination by overlapping (i.e., superposing, or aligning at the same position) the in-focus image of the reference mark and the in-focus image of the alignment mark, which are independently focused by means of one optical system and the other optical system, respectively. In other words, in spite of the presence of the space between the reference mark and the alignment mark, the invention makes the depth of field of each optical system as small as possible, while thereby raising magnification thereof. As a result thereof, the invention makes it possible to perform the positional determination of the liquid ejecting heads with a high precision.

In the configuration of the liquid ejecting head alignment apparatus described above, it is preferable that a first optical path and a second optical path, which share the optical axis, branch from each other at a first beam splitter, and after reflection by respective mirrors, join into a single optical path at a second beam splitter to reach one image pickup unit that is provided as an external device; and two focal lenses are provided on the optical paths between the first beam splitter and the second beam splitter, one of the focal lenses being capable of adjusting the focal position of the reference mark, and the other thereof being capable of adjusting the focal position of the alignment mark. With the configuration described above, it is possible to perform alignment by means of a single image pickup unit.

In the configuration of the liquid ejecting head alignment apparatus described above, it is preferable that a first optical path and a second optical path, which share the optical axis, branch from each other at a beam splitter, and the split first optical path reaches one of two image pickup units that are provided as external devices, whereas the split second optical path reaches the other thereof; two focal lenses are provided on the optical paths between the beam splitter and the image pickup units, one of the focal lenses being capable of adjusting the focal position of the reference mark, and the other thereof being capable of adjusting the focal position of the alignment mark; and the liquid ejecting head alignment apparatus further has an image combination section that combines images outputted from the two image pickup units. With the configuration described above, although it is necessary to provide two image pickup units and to combine the images outputted from these two image pickup units, the configurations of the optical paths are simplified as it is not necessary to perform optical axis adjustment when joining one optical path and the other optical path.

In the configuration of the liquid ejecting head alignment apparatus described above, it is preferable that the mask is provided with convex portions each of which protrudes along the optical axis toward the alignment mark; and the reference mark is provided on the upper surface of each of the convex portions. With the configuration described above, it is possible to shorten the distance between the reference mark and the alignment mark, which makes the misalignment of the optical axis as small as possible. In addition thereto, it is not necessary to configure the base jig as a thin structure and it is possible to maintain the mechanical strength of the base jig so as to effectively avoid the deformation/damage thereof, which will contribute to positional determination with a high precision.

In the configuration of the liquid ejecting head alignment apparatus described above, it is preferable that the bifocal microscope is constituted as a set of two microscopes, the two bifocal microscopes being provided in order to concurrently observe two alignment marks one of which is provided at one end of a line and the other of which is provided at the other end thereof, viewed in the longitudinal direction of the nozzle plate of one ink-jet recording head; and the distance between one and the other of the optical axes is in accordance with the distance between one and the other of the alignment marks for the concurrent observation. With the configuration described above, it is possible to perform positional determination on the basis of two alignment points. Therefore, in comparison with a case where alignment is carried out in two executions, that is, one alignment point at a time, the above-described configuration makes it possible not only to reduce time taken for positional determination by half but also to avoid the occurrence of misalignment (i.e., disalignment/shift) of the first-aligned position during the alignment of the second alignment position. For these reasons, it is possible to perform positional determination more speedily.

In the configuration of the liquid ejecting head alignment apparatus described above, it is preferable that the bifocal microscope is constituted as a set of a plurality of microscopes, the plurality of bifocal microscopes being provided in order to concurrently observe the alignment marks which are provided respectively in the nozzle plates of the plurality of ink-jet recording heads; and the distance between the optical axes is in accordance with the distance between the alignment marks of the nozzle plates adjacent to one another for the concurrent observation. With the configuration described above, it is possible to perform positional determination for the plurality of liquid ejecting heads in a single alignment execution. As a result thereof, it is possible to perform positional determination in a most speedy manner.

In the configuration of the liquid ejecting head alignment apparatus described above, it is preferable that the mask and the spacer jig that supports the liquid ejecting heads are moved as one with the optical axis of the bifocal microscope being fixed so that the reference mark and the alignment mark, which are the targets of alignment, position on the optical axis or in the proximity thereof. With the configuration described above, since the optical axis of the bifocal microscope is fixed, it is possible to perform, in a speedy manner and with a high precision, positional adjustment as the mask and the spacer jig that supports the liquid ejecting heads are moved. It is far easier to maintain the posture of the mask and the spacer jig than to adjust the misalignment of the optical axis when the optical axis is moved. This is because that the optical axis gets significantly misaligned due to a slight change in the posture of the optical system.

In order to address the above-identified problems without any limitation thereto, a second aspect of the invention provides a liquid ejecting head alignment method that is used for positional determination and adhesion of nozzle plates and a fixation member, each of the nozzle plates having nozzle openings through which each of a plurality of liquid ejecting heads ejects liquid and further having alignment marks for positional alignment, the fixation member holding the nozzle-plate side of the plurality of liquid ejecting heads. The liquid ejecting head alignment method according to the second aspect of the invention includes the steps of: positioning a mask and the liquid ejecting heads to be opposed to each other with a space being left therebetween, the mask being made of a transparent material, and the mask having reference marks each of which is aligned with the corresponding alignment mark; orienting the optical axis of the bifocal microscope from the mask toward the alignment mark via the reference mark and the space so as to concurrently obtain the image of the reference mark and the image of the alignment mark; and performing the positional determination by aligning the image of the reference mark and the image of the alignment mark so that the image of the reference mark and the image of the alignment mark overlap each other, the images being obtained via two optical systems that shares the optical axis, one of the optical systems being capable of focusing on the reference mark, and the other thereof being capable of focusing on the alignment mark. According to the method described above, since it is possible to concurrently observe the reference mark and the alignment mark by means of the bifocal microscope, it is possible to perform positional determination by overlapping (i.e., superposing, or aligning at the same position) the in-focus image of the reference mark and the in-focus image of the alignment mark, which are independently focused by means of one optical system and the other optical system, respectively. As a result thereof, the invention makes it possible to perform the positional determination of the liquid ejecting heads with a high precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

Ink-Jet Recording Head Unit (Liquid Ejecting Head Unit)

Before explaining an alignment apparatus according to an embodiment of the present invention, an example of the configuration of an ink-jet recording head unit having an ink-jet recording head is explained below. It should be noted that the ink-jet recording head described below is nothing more than an illustrative example of various kinds of liquid ejecting heads, which are the target of alignment according to the invention.

Figure 1:
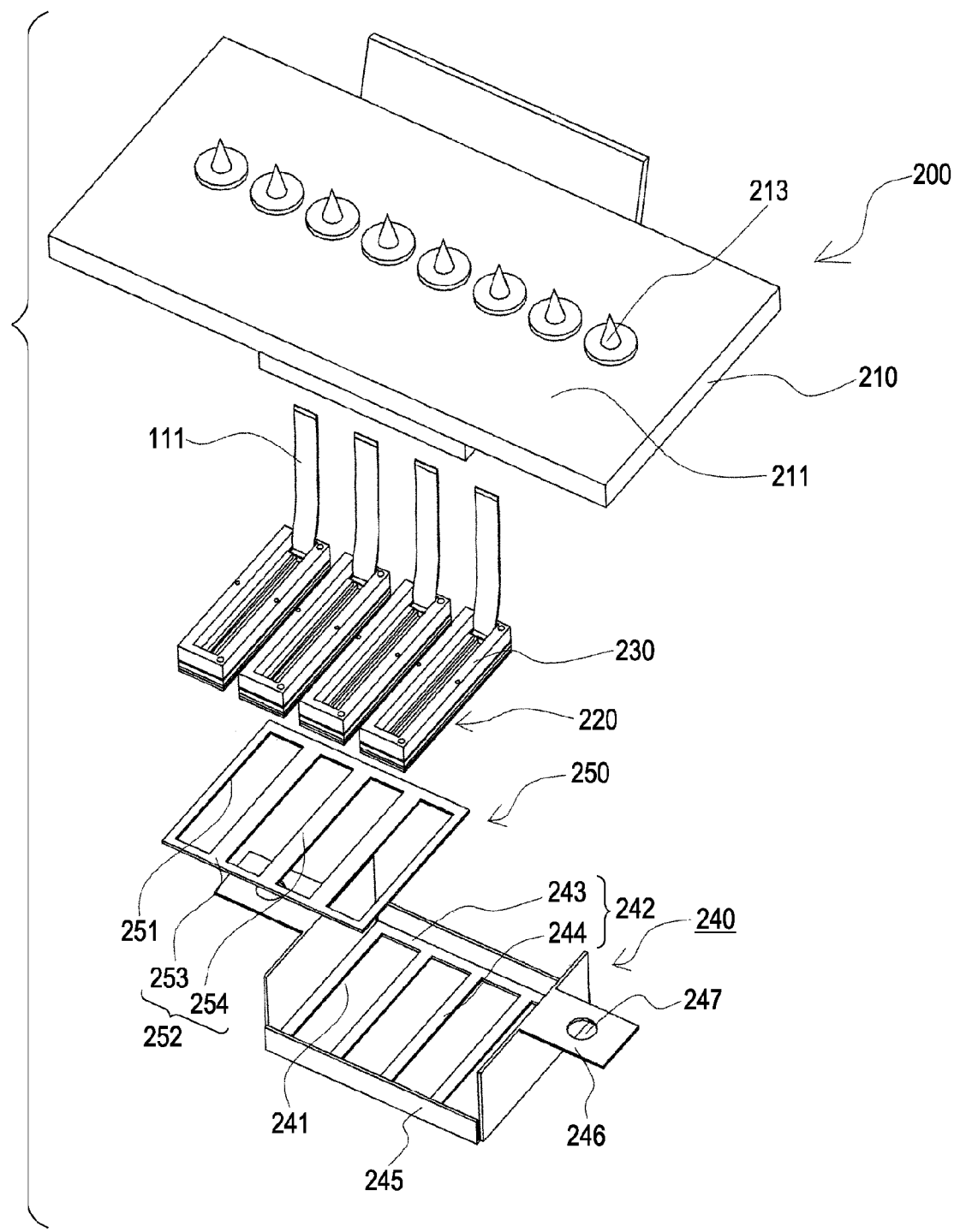
FIG. 1 is an exploded perspective view of an ink-jet recording head unit that is subjected to alignment according to an exemplary embodiment of the invention.
Figure 2:
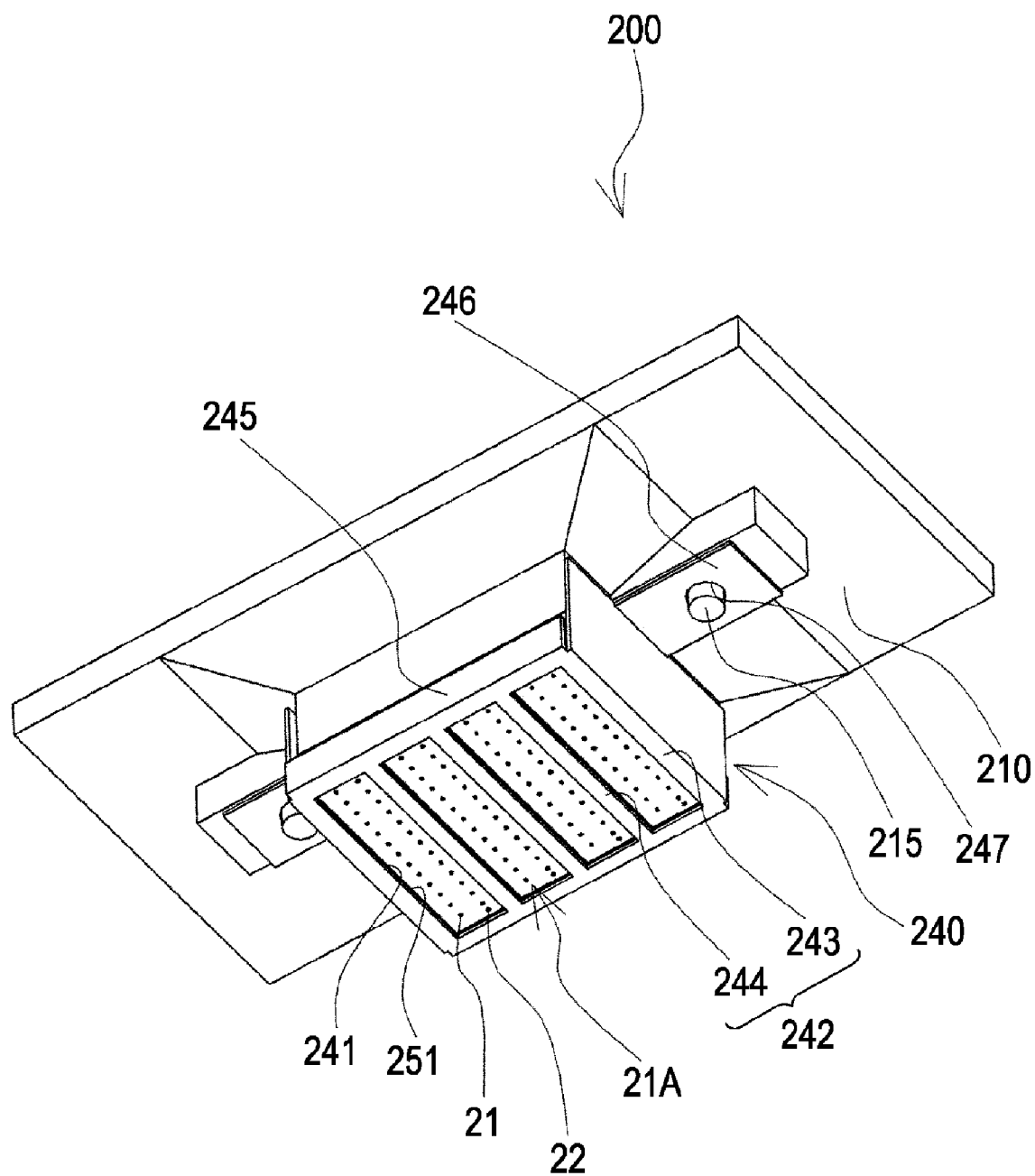
FIG. 2 is an assembled perspective view of the ink-jet recording head unit that is subjected to alignment according to an exemplary embodiment of the invention.
Figure 3:
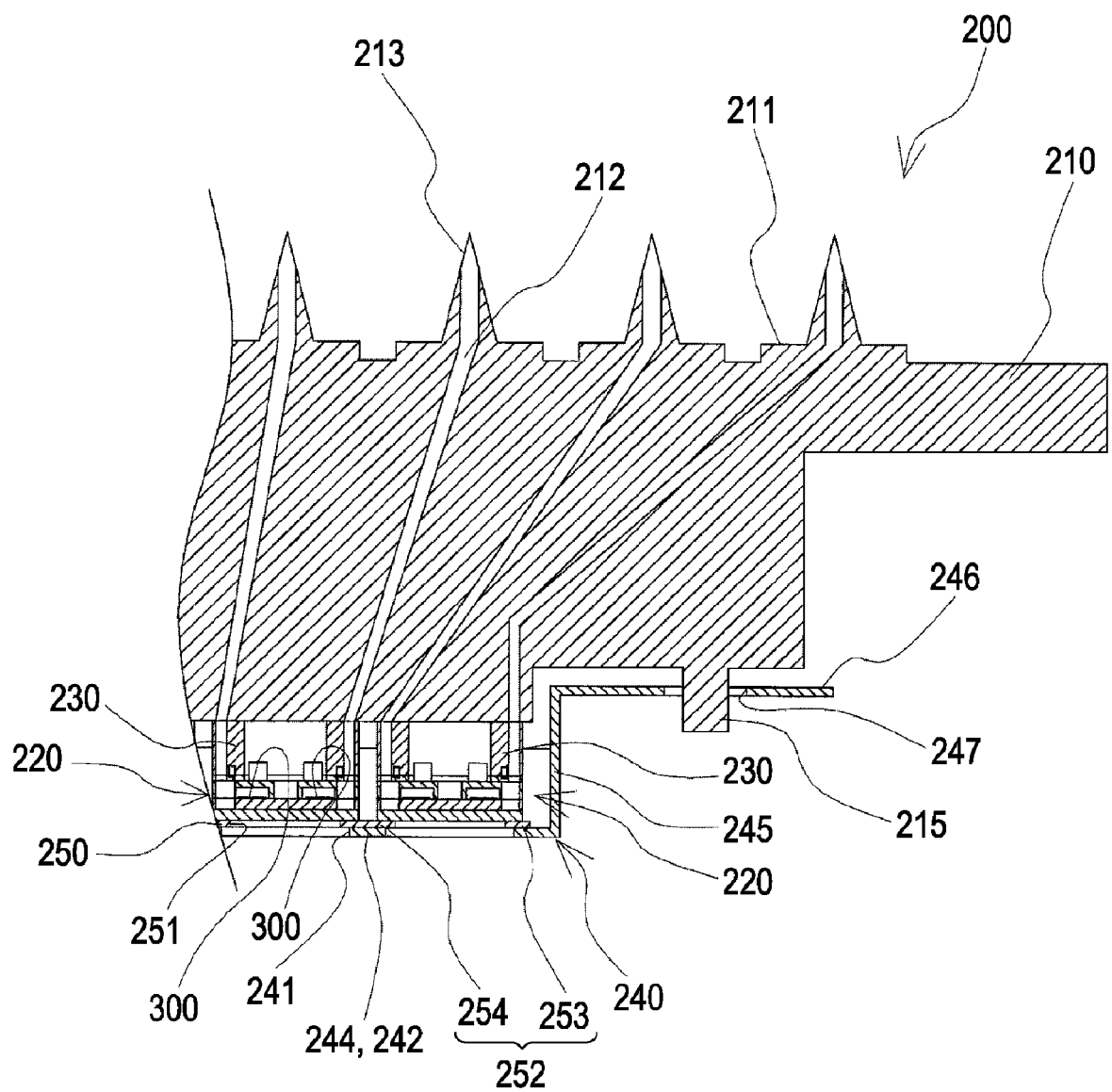
FIG. 3 is a sectional view of the ink-jet recording head unit that schematically illustrates an example of the essential components thereof.

FIG. 1 is an exploded perspective view of an ink-jet recording head unit. FIG. 2 is an assembled perspective view of the ink-jet recording head unit. FIG. 3 is a sectional view of the ink-jet recording head unit that schematically illustrates the essential components thereof.

As illustrated in these drawings, an ink-jet recording head unit 200 (hereafter simply referred to as head unit 200) has a cartridge case 210, ink-jet recording heads 220, head cases 230, a cover head 240, and a holding plate 250.

The cartridge case 210 is a member that supports ink cartridges, which are not shown in the drawings. The cartridge case 210 is provided with a cartridge attachment unit 211 to which each of the ink cartridges is detachably attached. The ink cartridges are ink-supplying means, each of which is configured as an independent unit separated therefrom. Black ink and three color inks are filled and retained in these ink cartridges, where each cartridge contains one color thereof. That is, the ink cartridges containing inks of these colors are attached to the cartridge case 210.

As illustrated clearly in FIG. 3, a plurality of ink communicating passages 212 are provided in the cartridge case 210. Specifically, one end of each of the plurality of ink communicating passages 212 opens at the cartridge attachment unit (211) side of the cartridge case 210, whereas the other end thereof opens at the head case (230) side thereof. At each open end of the ink communicating passages 212 at the cartridge attachment unit (211) side of the cartridge case 210, an ink supply needle 213, which is to be inserted through the ink supply port of an ink cartridge, is provided. Each of the ink supply needles 213 is attached thereto with a filter being interposed therebetween. The filter, which is not shown in the drawing, is provided in the ink communication passage 212 in order to catch any air bubble and/or foreign object that are present in ink.

The head cases 230 are attached to the bottom surface of the cartridge case 210. Each of the ink-jet recording heads 220 is provided with a plurality of piezoelectric elements 300. Through the driving of the piezoelectric elements 300, the ink-jet recording head 220 discharges ink drops from its nozzle openings (holes) 21 at one surface thereof that is opposite to the other surface facing the cartridge case 210. A plurality of the ink-jet recording heads 220 correspond to respective ink colors so that each of the ink-jet recording heads 220 discharges ink of a corresponding color retained in an ink cartridge. Accordingly, a plurality of head cases 230 are provided, each on an independent basis, so as to correspond to the plurality of the ink-jet recording heads 220.

Figure 4:
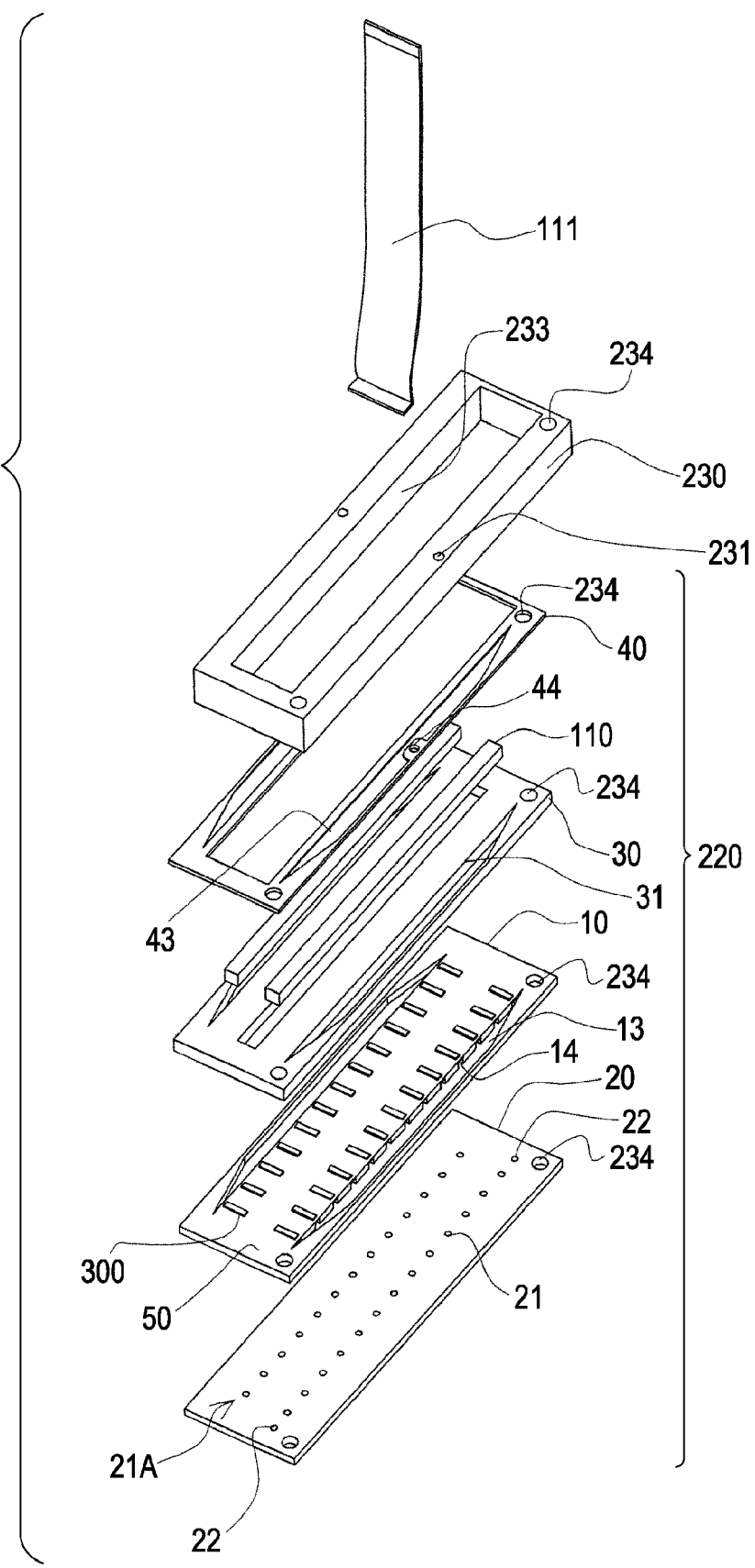
FIG. 4 is an exploded perspective view of the ink-jet recording head unit that schematically illustrates an example of the essential components thereof.
Figure 5:
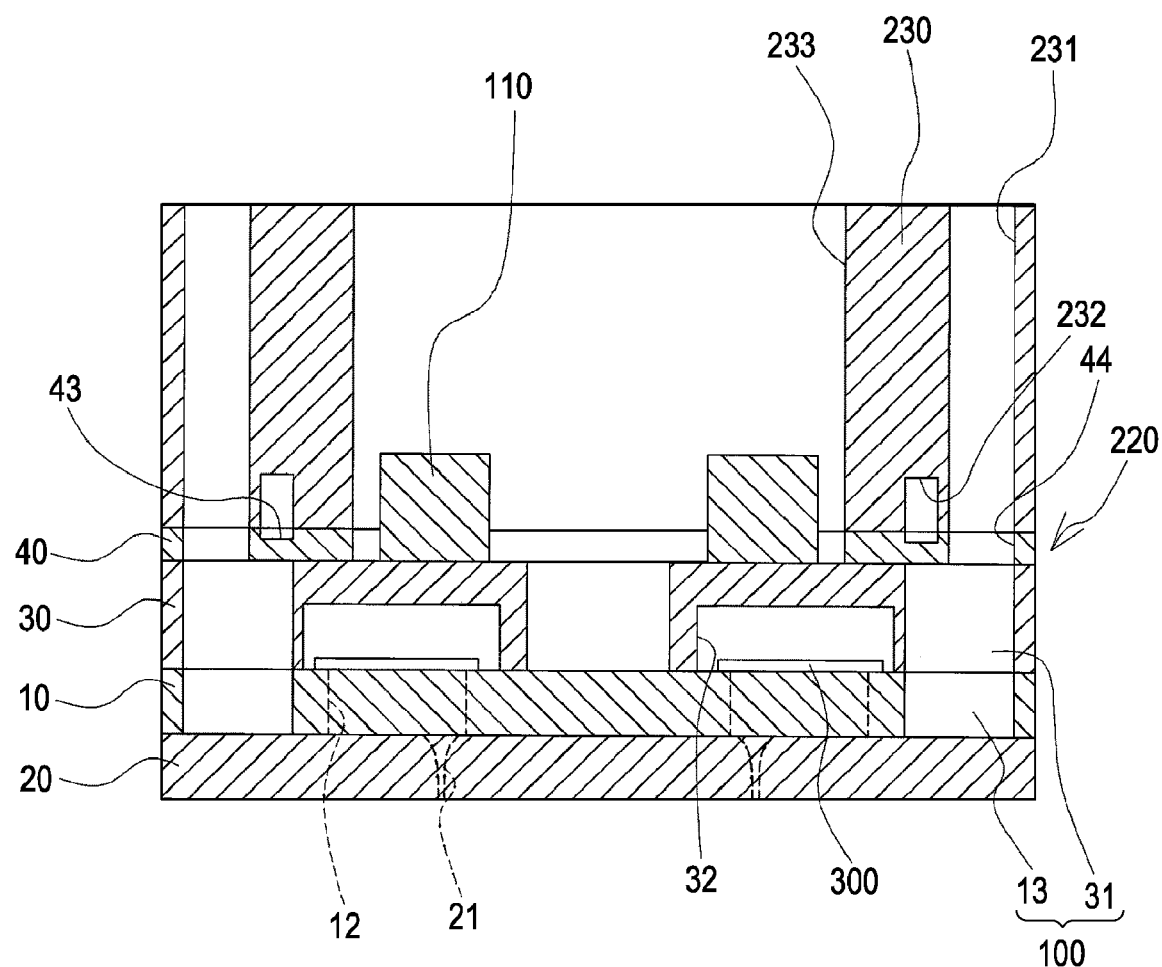
FIG. 5 is a sectional view of the ink-jet recording head of the head unit and the head case.

With reference to FIGS. 4 and 5, the configurations of the ink-jet recording head 220 and the head case 230 described above are further explained in detail below. FIG. 4 is an exploded perspective view of the ink-jet recording head unit 200 that schematically illustrates an example of the essential components thereof. FIG. 5 is a sectional view of the ink-jet recording head 220 and the head case 230.

As illustrated in these drawings, the ink-jet recording head 220 is made up of four substrates, that is, a nozzle plate 20, a fluid channel formation substrate 10, a protection substrate 30, and a compliance substrate 40. In the illustrative example of the present embodiment of the invention, the fluid channel formation substrate 10 is made of silicon single crystal. An elastic membrane 50, which is made of silicon dioxide, is pre-formed on one surface of the fluid channel formation substrate 10 through thermal oxidation. Pressure generation chambers (i.e., compartments) 12, which are demarcated by a plurality of partition walls, are formed in the fluid channel formation substrate 10. In the example explained herein, two lines of the pressure generation chambers 12, viewed in the width direction of the fluid channel formation substrate 10, are formed therein. By employing an anisotropic etching technique, the pressure generation chambers 12 are formed from the opposite side of the fluid channel formation substrate 10. A communicating portion 13 is formed at an area outside of each line of pressure generation chambers 12, viewed in the longitudinal direction thereof. Each of the communicating portions 13 is in communication with a reservoir portion 31 that is provided in the protection substrate 30 that will be described later. In communication with each other, the communicating portion(s) 13 and the reservoir portion(s) 31 constitute a reservoir 100, which serves as a common ink chamber/compartment for each of the pressure generation chambers 12. The communicating portion 13 is in communication with the "longitudinal-direction-one-end-portion" of each of the pressure generation chambers 12 via an ink supply passage 14.

The nozzle plate 20 is affixed to the opening-surface-side of the fluid channel formation substrate 10 by means of an adhesive, a thermal deposition/welding film, or any other similar alternative means. The nozzle openings 21 are formed/bored in the nozzle plate 20, each at a position opposite to the ink supply passage 14 of each of the pressure generation chambers 12. In the exemplary embodiment described herein, two nozzle lines 21A, which are constituted by a pair of lines of the nozzle openings 21 formed in parallel with each other, are provided in each of the ink-jet recording heads 220.

It is preferable that the nozzle plate 20 is made of glass ceramics, silicon single crystal, stainless steel, or the like that has a thickness of, for example, 0.01 mm through 1 mm, and a coefficient of linear expansion of 300 degrees Celsius or less (e.g., 2.5-4.5 $[10^{-6}/°C.]$). It should be particularly noted that the nozzle plate 20 has alignment marks 22 (which will be described in detail later) that are used when aligning the positions thereof with the holding plate 250. In the example described herein, two alignment marks 22 are provided next (in an outward direction) to the respective ends of one of two parallel lines of the nozzle openings 21. These alignment marks 22 are easily formed through punch processing, which is performed in the same process as the punching of the nozzle openings 21.

The piezoelectric elements 300 are provided on the elastic membrane 50 at a side opposite to the opening-surface-side of the fluid channel formation substrate 10. The piezoelectric elements 300 are formed by sequentially laminating, an insulating film 55 made of zirconium oxide, a lower electrode film made of metal, a piezoelectric layer made of lead zirconate titanate (PZT) or the like, and an upper electrode film made of metal.

The protective substrate 30 is bonded (or adhered by any other alternative means, the same hereafter) to the fluid channel formation substrate 10 on which the piezoelectric elements 300 are formed. In the example described herein, the reservoir portion 31 is formed in such a manner that it penetrates the protective substrate 30 in a thickness direction thereof while extending in the width direction of the pressure generation chamber 12. As has already been described, the reservoir portion 31 is in communication with the communicating portion 13 of the fluid channel formation substrate 10 in such a manner that the reservoir portion 31 and the communicating portion 13 constitute the reservoir 100, which serves as a common ink chamber/compartment for each of the pressure generation chambers 12. A piezoelectric holding portion 32 is provided at an area opposed to each of the piezoelectric elements 300 of the protective substrate 30. The piezoelectric holding portion 32 is provided while leaving a space that is wide enough so as not to obstruct the motion of the piezoelectric element 300. The protective substrate 30 having the configuration described above may be made of glass, ceramic, metal, plastic, or the like. Preferably, the protective substrate 30 should be made of a material having the substantially same coefficient of thermal expansion as that of the fluid channel formation substrate 10. In the example described herein, the protective substrate 30 is made of silicon single crystal, that is, the same material that constitutes the fluid channel formation substrate 10.

Driving ICs 110, which function to drive each of the piezoelectric elements 300, are provided on the protective substrate 30. Each terminal of the driving ICs 110 is connected to a line that is drawn out from an individual electrode of each of the piezoelectric elements 300 via a bonding wire or the like, which is not shown in the drawing. The terminals of the driving ICs 110 are connected to the outside via an external wiring 111 made of a flexible printed cable (FPC) or the like, which is illustrated in FIG. 1. Through the external wiring 111, the driving IC 110 receives various kinds of signals including but not limited to a printing signal from an external device connected thereto.

The compliance substrate 40 is bonded to the protective substrate 30. Ink feed holes 44, each of which is provided to supply ink to the reservoir 100, are formed at some part of regions opposed to the reservoirs 100 in such a manner that the ink feed hole 44 penetrates through the compliance substrate 40 in a thickness direction thereof. The remaining part of the region of the compliance substrate 40 opposed to the reservoir 100, that is, the other part of the region opposed to the reservoir 100 where the ink feed hole 44 are not formed, is formed each as a flexible portion 43 having a relatively smaller thickness. The flexible portion 43 seals the reservoir 100. The flexible portions 43 give compliance inside the reservoirs 100. Further additional explanation is provided below for the purpose of making description herein more complete and detailed. The head case 230 that has ink supply communicating passages 231 is provided on the compliance substrate 40. The head case 230 has concave portions 232 corresponding respectively to the flexible portions 43. With such a structure, the flexible portion 43 gets deflected in a flexible manner when it is necessary.

The head case 230 has a driving IC holding portion 233 that is formed by penetrating the head case 230 in a thickness direction thereof at an area/region opposed to the driving ICs 110 provided on the protective substrate 30. The external wiring 111 is configured to pass through the driving IC holding portion 233 to be electrically connected to the driving ICs 110.

Each of the ink-jet recording heads 220 having the configuration described above takes in ink from an ink cartridge via the ink communicating passage 212 (refer to FIG. 3), the ink supply communicating passage 231, and the ink feed hole 44 in the order of appearance herein so as to fill the inner structure of the ink-jet recording head 220, more specifically, from the reservoir 100 to the nozzle openings 21, with the ink. Under such an ink-filled state, a voltage is applied to each of the piezoelectric elements 300 corresponding to the pressure generation chambers 12 in accordance with a recording signal coming from the driving ICs 110 so as to deflect the elastic membrane 50 and the piezoelectric element 300. By this means, the inner pressure of each of the pressure generation chambers 12 is raised so as to discharge ink drops from the nozzle openings 21.

Each member/component that makes up the ink-jet recording head 220 described above as well as the head case 230 is provided with pin insertion holes 234, which are formed at two of four corners thereof to be used for positional determination of these members/components at the time of assembly thereof. A pin is inserted through each of the pin insertion holes 234 so as to make relative positional determination between these members and/or components, followed by bonding of these members and/or components together with the positional determination pins being inserted therethrough. By this means, the ink-jet recording head 220 and the head case 230 are assembled into a single integrated unit.

The ink-jet recording heads 220 described above are manufactured as follows. First of all, a large number of chips are formed at the same time on a single piece of silicon wafer.

Then, the nozzle plate 20 and the compliance substrate 40 are bonded thereto so as to form a single integrated in-process product. Subsequently, the single integrated in-process wafer is diced into a number of the fluid channel formation substrates 10 illustrated in FIG. 4, each having one chip size thereof.

Four of the assembled combinations of the ink-jet recording heads 220 and the head cases 230 are fixed onto the cartridge case 210 with a certain predetermined space allocated each therebetween in such a manner that these assembled combinations are arranged in a direction in which the nozzle lines 21A thereof are aligned with one another. That is, eight lines, in total, of the nozzle lines 21A are provided on these head units 200.

As described above, by increasing the number of the nozzle lines 21A, each of which is made up of the nozzle openings 21 aligned in parallel with the other of a pair thereof of the ink-jet recording head 220 by means of not a singularity but a plurality of ink-jet recording heads 220, it is possible to ensure a relatively high production yield rate in comparison with a case where an increased number (i.e., in this context, more than two) of the nozzle lines 21A are formed on just one ink-jet recording head 220. In addition thereto, the employment/adoption/use of a plurality of the ink-jet recording heads 220 for the purpose of increasing the number of the nozzle lines 21A makes it possible to also increase the number of chips, each of which is used as a material for the ink-jet recording head 220, that can be diced out of a single piece of silicon wafer. Therefore, it is further possible to decrease the wasted area of the silicon wafer, thereby efficiently reducing the production cost thereof.

The holding plate 250 supports these four ink-jet recording heads 220 with positions thereof being determined in a fixed manner thereby as illustrated in FIGS. 1-3. The holding plate 250, which is a common fixation member, is bonded to the ink-drop-discharging surfaces of these ink-jet recording heads 220. The holding plate 250, which is made of a flat plate, has an exposure-opening portion 251 and a bonding portion 252. The exposure-opening (i.e., window) portion 251 of the holding plate 250 exposes the nozzle openings 21. The bonding portion 252 thereof, which demarcates the exposure-opening portion 251 thereof, are bonded to at least both side (end) portions of the nozzle lines 21A of the ink-drop-discharging surfaces of these ink-jet recording heads 220.

The bonding portion 252 of the holding plate 250 is made up of a fixation frame portion 253 and fixation beam portions 254. The fixation frame portion 253 of the bonding portion 252 is a peripheral frame that encloses the ink-drop-discharging surfaces of these ink-jet recording heads 220. Each of the fixation beam portions 254 thereof extends between two of the ink-jet recording heads 220 adjacent to each other in such a manner that these fixation beam portions 254 divide/split the exposure-opening portion 251. The bonding portion 252 of the holding plate 250, which is constituted by the fixation frame portion 253 and the fixation beam portions 254, is bonded to the ink-drop-discharging surfaces of these ink-jet recording heads 220. In addition thereto, the fixation frame portion 253 of the bonding portion 252 is configured to cover the pin insertion holes 234, which are formed for positional determination of the members/components at the time of assembly of the ink-jet recording heads 220.

As a material for the holding plate 250 having the configuration described above, for example, a metal such as a stainless steel, glass ceramics, or silicon single crystal may be preferably used. Note that it is preferable to use a material having the substantially same coefficient of thermal expansion as that of the nozzle plate 20 for the holding plate 250 for the purpose of avoiding the deformation of the holding plate 250 due to a difference in thermal expansion between the holding plate 250 and the nozzle plate 20. For example, it is preferable to form the holding plate 250 by means of a silicon single crystal board if the nozzle plate 20 is made of silicon single crystal.

In addition thereto, the holding plate 250 should be, preferably, formed as a thin structure. It is preferable to make the holding plate 250 thinner than the cover head 240, which will be described later. The reason why the holding plate 250 should be formed as a thin structure is that, if formed to be thick, residual ink is more likely to remain (not wiped) between the fixation beam portions 254 after wiping of the ink-drop-discharging surfaces of the nozzle plates 20. That is, if the holding plate 250 is formed to be thin, it is possible to effectively avoid any residual ink from remaining on the ink-drop-discharging surfaces of the nozzle plates 20 after wiping thereof.

Specifically, in the example explained herein, the thickness of the holding plate 250 is configured to be 0.1 mm. The bonding of the holding plate 250 and the nozzle plate 20 is not limited to any specific means (including one described herein). That is, for example, the holding plate 250 may be preferably bonded to the nozzle plate 20 by means of a thermosetting epoxy adhesive, an ultraviolet hardening-type (UV cure) adhesive, without any limitation thereto.

As described above, since each of the fixation beam portions 254 of the bonding portion 252 of the holding plate 250 covers a gap between two ink-jet recording heads 220 adjacent to each other, it is possible to prevent ink from infiltrating between the two adjacent ink-jet recording heads 220. For this reason, the components of the ink-jet recording heads 220 such as the piezoelectric elements 300, the driving ICs 110, without any limitation thereto, are protected from otherwise possible degradation and/or damages due to the infiltration of ink. In addition thereto, since the ink-drop-discharging surface of the ink-jet recording head 220 is bonded to the holding plate 250 by means of an adhesive with no gap left therebetween, it is possible to prevent a recording target medium (such as paper) from entering (i.e., getting pinched/jammed) therebetween. Thus, the deformation of the holding plate 250 and paper jam malfunction do not occur.

As described above, the head unit 200 has four ink-jet recording heads 220 each of which is attached/fixed to the holding plate 250. The positional determination for aligning these ink-jet recording heads 220 with the holding plate 250 is performed by means of an alignment apparatus, which will be explained later.

As illustrated in FIGS. 1 and 2, the head unit 200 is further provided with the cover head 240, which has a box-like shape so as to cover each of the ink-jet recording heads 220. The cover head 240 is provided at one side of the holding plate 250 opposite to the other side that is adhered to the ink-jet recording heads 220. The cover head 240 has a fixation portion 242 and sidewall portions 245. The fixation portion 242 thereof demarcates an opening (window) portion 241 that corresponds to the exposure-opening portion 251 of the holding plate 250. The sidewall portions 245 thereof are formed by bending a cover head material in such a manner that each side thereof extends toward the side surface of the ink-drop-discharging surface of the ink-jet recording head 220 so as to cover the periphery of the holding plate 250.

The fixation portion 242 of the cover head 240 is made up of a frame portion 243 and beam portions 244. The frame portion 243 corresponds to the fixation frame portion 253 of the holding plate 250, whereas the beam portions 244 corresponds to the fixation beam portions 254 thereof. The fixation portion 242 of the cover head 240, which is made up of the frame portion 243 and the beam portions 244 as described above, is bonded to the bonding portion 252 of the holding plate 250.

As explained above, since the ink-drop-discharging surface of the ink-jet recording head 220 is bonded to the cover head 240 with no gap left therebetween, it is possible to prevent a recording target medium (such as paper) from entering therebetween. Thus, the deformation of the cover member 240 and paper jam malfunction do not occur. In addition thereto, it is possible to prevent the infiltration of ink over/into the side surfaces of the ink-jet recording heads 220 without failure because the sidewall portions 245 of the cover head 240 completely cover the outer edges of the ink-jet recording heads 220.

An example of conceivable materials for the cover head 240 is a metal such as stainless steel. The cover head 240 may be manufactured by press-working a metal plate, or alternatively, by metal-forming thereof. The cover head 240 can be grounded if an electrically conductive metal material is employed.

It is necessary for the cover head 240 to have a certain degree of mechanical strength in order to effectively protect the ink-jet recording heads 220 from external impacts due to wiping, capping, or the like. For this reason, the cover head 240 needs to be relatively thick. Specifically, in the example explained herein, the thickness of the cover head 240 is configured to be 0.2 mm.

The bonding of the cover head 240 and the holding plate 250 is not limited herein. As an example of various adhesion methods, a thermosetting epoxy adhesive may be used.

Flange portions 246 are provided near the sidewall portions 245 of the cover head 240. Each of the flange portions 246 has a fixation hole 247, which is used for determining the position of the cover head 240 with respect to other members. A cover head material is bent from the sidewall portion 245 in a surface direction parallel to the ink-drop-discharge surface so as to form each of the flange portions 246. As illustrated in FIGS. 2 and 3, the cover head 240 according to the exemplary embodiment explained herein is fixed to the cartridge case 210, which functions as a supporting member that holds the ink-jet recording heads 220 and the head cases 230.

Specifically, as illustrated in FIGS. 2 and 3, the cartridge case 210 is provided with projections 215 each of which protrudes toward the ink-drop-discharge surface. The projections 215 are configured such that they can be inserted through the respective fixation holes 247 of the cover head 240. The cover head 240 is fixed to the cartridge case 210 by inserting the projections 215 through the respective fixation holes 247 of the cover head 240, and then by heat-caulking or heat-crimping the tip of each of the projections 215. As the diameter of each of the projections 215 provided on the cartridge case 210 is smaller than that of the corresponding fixation hole 247 of the flange portion 246, it is possible to determine the position of the cover head 240 in the ink-drop-discharge surface direction, and then to attach the cover head 240 to the cartridge case 210 after positional alignment.

The cover head 240 is fixed to the holding plate 250, which the ink-jet recording heads 220 are bonded to, through positional determination of the fixation holes 247 of the cover head 240 and the plurality of nozzle lines 21A. The positional determination of the fixation holes 247 of the cover head 240 and the plurality of nozzle lines 21A may be carried out by means of an alignment apparatus which will be described later. Or, alternatively, the positional determination of the cover head 240 and fixation thereof may be carried out at the same time when the positional determination and fixation of the holding plate 250 and the ink-jet recording heads 220 are carried out.

First Embodiment

With reference to the accompanying drawings, an alignment apparatus according to a first exemplary embodiment of the invention is explained in detail below. It should be noted that, in the following description, the same reference numerals are consistently used for the same components as those illustrated in FIGS. 1-5 to omit any redundant explanation thereof.

Figure 6:
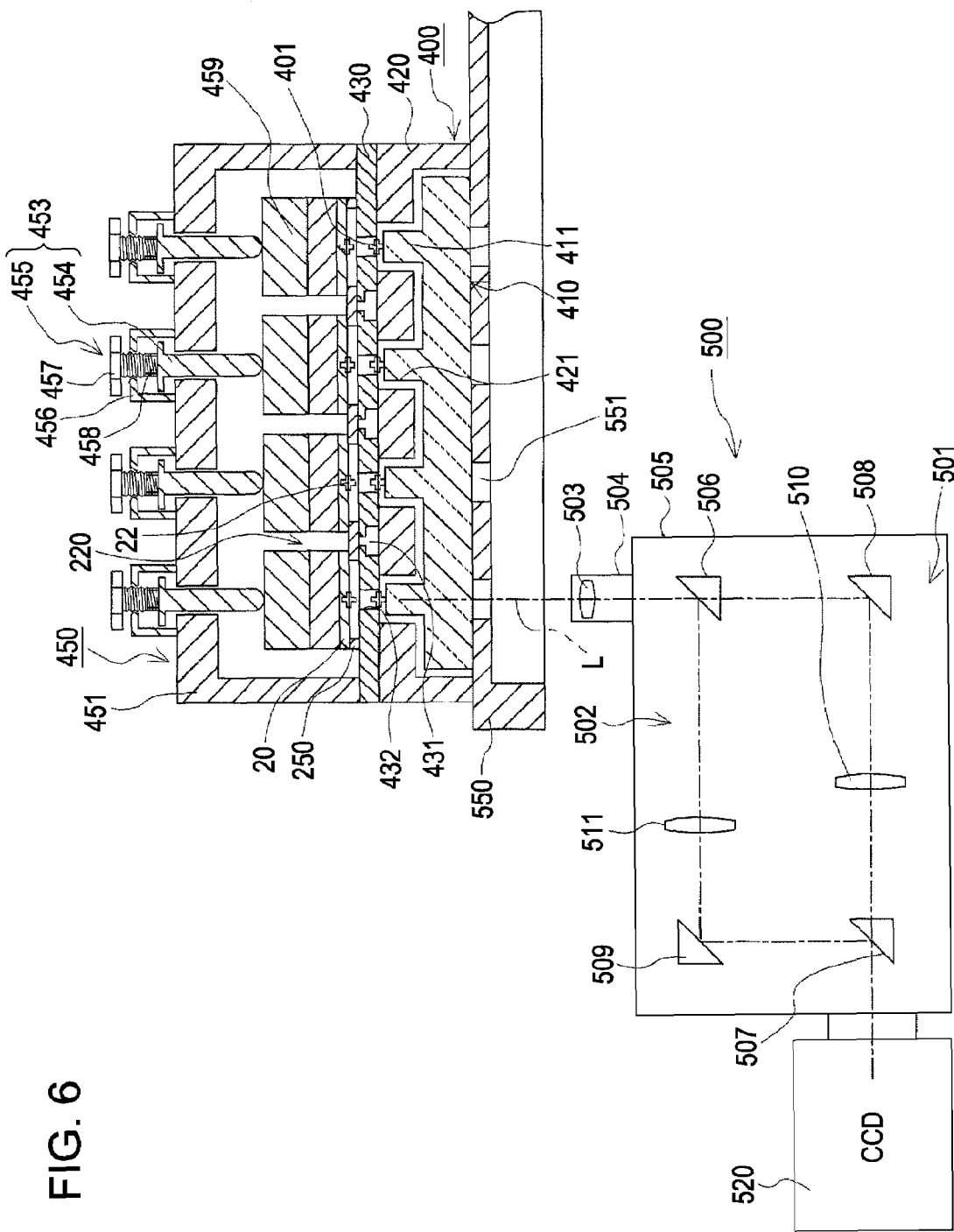
FIG. 6 is a sectional view that schematically illustrates an example of an alignment apparatus according to a first exemplary embodiment of the invention.

FIG. 6 is a sectional view of an alignment apparatus according to the present embodiment of the invention. As illustrated in FIG. 6, an alignment apparatus according to the present embodiment of the invention is provided with an alignment jig (fixture) 400, a depressing unit 450, a bifocal microscope 500, and a position move stage (i.e., alignment move stage/transportation stage) 550. The ink-jet recording heads 220, which are the target of alignment herein, are placed on the alignment jig 400. Functioning in cooperation with the alignment jig 400, the depressing unit 450 presses the ink-jet recording heads 220 down toward the holding plate 250. The bifocal microscope 500 has an optical system for observing the ink-jet recording heads 220 through the alignment jig 400. That is, the bifocal microscope 500 (and thus the optical system thereof) is provided below the alignment jig 400. The position move stage 550, which supports a mask 410, is capable of being moved in a horizontal direction perpendicular to the optical axis L of the bifocal microscope 500.

The alignment jig 400 has the mask 410 on which reticule marks (i.e., reference marks) 401 are printed or provided by any other means, a base jig (fixture) 420 for attaching the alignment jig 400 to the position move stage 550, and a spacer jig (fixture) 430 that supports the holding plate 250, which is a fixation member. The spacer jig 430 is provided on the base jig 420. The base jig 420 is attached to the position move stage 550. The holding plate 250 is fixedly placed on the spacer jig 430. While observing relative positional relationship between each of the reticule marks 401 of the mask 410 fixed to the position move stage 550 and the corresponding alignment mark 22 of the nozzle plate 20, the positional determination of the reticule marks 401 and the alignment marks 22 is performed. After positional determination thereof, the holding plate 250 and the nozzle plates 20 of the ink-jet recording heads 220 are adhered to each other by means of an adhesive. Although the base jig 420 is provided to cover the mask 410, there is a small clearance between the base jig 420 and the mask 410. The reason why the gap is left between the base jig 420 and the mask 410 is to prevent the occurrence of any possible crack, damage, or the like due to abrasion therebetween. As the base jig 420 and the mask 410 are provided without being in contact with each other, the invention ensures that such abrasion does not occur.

The base jig 420 is made of a stainless steel or the like that has a box-like shape that opens at the bottom side thereof. The base jig 420 has through holes 421, each of which is configured as a "mono hole" that penetrates through the base jig 420 in a thickness direction thereof at a region/area corresponding to a counterpart where a corresponding reticule mark 401 of the mask 410 is printed/provided. The positions of the through holes 421 of the base jig correspond respectively to communicating holes (through holes) 432 of the spacer jig 430.

The mask 410 is made of a transparent material, for example, quartz glass (silica glass) or the like. In the exemplary embodiment of the invention described herein, the mask 410 is provided with convex portions 411, each of which protrudes inside the corresponding through hole 421 of the base jig 420 without being in contact therewith. The reticule mark 401 is printed/provided at the tip of each of the convex portions 411. Each of the convex portions 411 is configured as a columnar structure formed for the reticule mark 401. In the present embodiment of the invention, since two alignment marks 22 are provided for each of the nozzle plates 20 of the ink-jet recording heads 220, two reticule marks 401 are provided for each of the ink-jet recording heads 220. Thus, it follows that eight reticule marks 401 are provided for four ink-jet recording heads 220.

It is preferable that the reticule mark 401 is provided at a height (i.e., vertical position) in the proximity of the corresponding alignment mark 22 of the nozzle plate 20. The reason why the reticule mark 401 should be provided at a height in the proximity of the corresponding alignment mark 22 is to shorten the distance between the reticule mark 401 and the alignment mark 22 so as to enhance the precision in positional determination. As the distance between the reticule mark 401 and the alignment mark 22 increases, it becomes difficult to assure a high precision in positional determination. In addition thereto, as the distance between the reticule mark 401 and the alignment mark 22 increases, disadvantageously, the optical axis of the optical system gets shifted significantly due to heat of a metal halide lamp or the like that is used for positional observation. Such a shift will cause an intolerable error in the actual positional relationship between the reticule mark 401 and the alignment mark 22.

For example, in a case where the convex portions 411 are not provided in the mask 410, the shift in the optical axis could be approximately 2.5 µm at its maximum, if it is assumed that the distance between the alignment mark 22 and the reticule mark 401 is, for example, 5.1 mm. Since the convex portions 411 are provided in the mask 410 in the present embodiment of the invention, assuming that the distance between the alignment mark 22 and the reticule mark 401 is shortened to be 110 µm or less thanks to the presence of the convex portions 411, it is possible to reduce the above-described shift in the optical axis attributable to heat to 0.05 µm or less. Thus, the invention makes it possible to achieve a high precision in positional determination.

On the other hand, if the convex portions 411 are too close to the nozzle plates 20, an adhesive that bonds the nozzle plates 20 and the holding plate 250 could taint the tip surface of the convex portion 411. If that occurs, there is a possibility that it becomes difficult/impossible to observe the alignment mark 22 and the reticule mark 401 by means of the optical system. Therefore, it is preferable that the tip surfaces of the convex portions 411 are distanced by a predetermined clearance from the nozzle plates 20.

As described above, in the above example, since the convex portions 411 are formed in/on the mask 410 so as to shorten the distance between the alignment marks 22 and the reticule marks 401, it is not necessary to reduce the thickness of the base jig 420 just for the purpose of making the distance therebetween shorter. If the thickness of the base jig 420 is reduced so as to shorten the distance between the alignment marks 22 and the reticule marks 401, the base jig 420 could get deformed and/or damaged when a pressing force is applied onto the ink-jet recording heads 220 toward the holding plate 250, which will cause an error in positional alignment of the reticule marks 401 with the alignment marks 22. In contrast, according to the present embodiment of the invention, it is not necessary to configure the base jig 420 as a thin structure because the convex portions 411 are provided in the mask 410. Thus, the invention makes it possible to maintain the mechanical strength of the base jig 420 so as to effectively avoid the deformation/damage thereof, which will contribute to positional determination with a high precision.

It should be noted that the base jig 420 is detachably supported by the position move stage 550. With such a configuration, when adhering the holding plate 250 to the ink-jet recording heads 220 through hardening of an adhesive, the base jig 420 may be used for other alignment jig. By this means, it is possible to reduce the cost of the alignment jig 400.

The spacer jig 430 functions to support the holding plate 250. Specifically, the spacer jig 430 is provided with a plurality of vacuuming chambers 431 made of a platy (i.e., plate-shape) member such as stainless steel or the like. Each of the vacuuming chambers 431 has a suction unit such as a vacuum pump provided inside thereof, which is not shown in the drawing. Each of the vacuuming chambers 431 opens (i.e., has an opening) at the surface of the spacer jig 430 so as to vacuum-chuck the surface of the holding plate 250. The spacer jig 430 further has communicating holes (through holes) 432, which are unfilled/open spaces. The communicating holes 432 are provided in order to make it possible to observe the alignment marks 22 of the ink-jet recording heads 220 that are vacuum-chucked to the holding plate 250 from the bottom surface of the mask 410 fixed to the position move stage 550. That is, the spacer jig 430 is provided between the holding plate 250 and the mask 410 in such a manner that the reticule mark 401 and the corresponding alignment mark 22 are opposed to each other with a space being left therebetween, where one surface of the spacer jig 430 is in contact with the holding plate 250 whereas the other surface thereof faces the convex portion 411 of the mask 410 on which the reticule mark 401 is printed/provided with some clearance/gap left therebetween. The reason why there is a clearance between the spacer jig 430 and the convex portion 411 is to prevent the surface on which the reticule mark 401 is printed/provided from being damaged due to abrasion.

The depressing unit 450 that applies a pressing force onto each of the ink-jet recording heads 220 toward the holding plate 250 is provided over the alignment jig 400 having the configuration described above. The depressing unit 450 has an arm portion 451 and depressing portions 453. The arm portion 451 of the depressing unit 450 is formed as a "reverse-U-shaped" structure, both of the ends of which are placed on the spacer jig 430 so as to enclose the ink-jet recording heads 220. The depressing portions 453 thereof are provided substantially on and partly through the arm portion 451 so as to depress the ink-jet recording heads 220 toward the holding plate 250.

The depressing portions 453 are provided at some regions/areas of the arm portion 451 in such a manner that each thereof is opposed to the corresponding one of the ink-jet recording heads 220. In the present embodiment of the invention, since four ink-jet recording heads 220 are attached to one holding plate 250, the same number of the depressing portions 453, that is, four thereof, are provided.

Each of the depressing portions 453 is made up of a depressing pin 454, a pin-urging unit 455, and a depressing contact member 459. The column-shaped depressing pin 454 penetrates through the arm portion 451 and moves freely in the axial direction thereof. The pin-urging unit 455, which is provided at the base (opposite to the tip) of the depressing pin 454, applies an urging force to the depressing pin 454 toward the corresponding ink-jet recording head 220. The depressing contact member 459 is placed between the depressing pin 454 and the corresponding ink-jet recording head 220.

Having a semi-round (i.e., dome-shaped) tip, the depressing pin 454 contacts the depressing contact member 459 at a point so as to apply a pressing force thereto.

In the present embodiment of the invention, the pin-urging unit 455, which is provided over the arm portion 451 so as to apply an urging force to the depressing pin 454 toward the corresponding ink-jet recording head 220, has a screw-supporting portion 456, a screw portion 457, and an urging spring 458. The screw-supporting portion 456 is provided to enclose the base side of the depressing pin 454. The screw portion 457 is "threadably" mounted on the screw-supporting portion 456. The urging spring 458 is provided between the tip surface of the screw portion 457 and the base of the depressing pin 454.

Having such a configuration, the pin-urging unit 455 can adjust the pressing force applied by the urging spring 458 to the depressing pin 454 in accordance with the clamping force of the screw portion 457 applied to the screw-supporting portion 456. By this means, it is possible to adjust the pressing force of each of the depressing pins 454 applied to the corresponding one of the depressing contact members 459.

The depressing contact member 459 is placed between the depressing pin 454 and the protective substrate 30 of the ink-jet recording head 220. The depressing pin 454 "point-contacts" (and depresses) the upper surface of the depressing contact member 459 so as to uniformly communicate/transmit the pressing force thereof to substantially the entire surface of the protection substrate 30 of the ink-jet recording head 220. In comparison with a case where the tip of the depressing pin 454 directly contacts the protective substrate 30 of the ink-jet recording head 220, the use of the depressing contact member 459 makes it possible to depresses the entire surface of the ink-jet recording head 220, which ensures that the ink-jet recording head 220 is fixed to the holding plate 250 without failure. Note that the depressing contact member 459 has an outer/peripheral shape that has the same size/dimension as, or a slightly smaller size/dimension than, that of the protective substrate 30 of the ink-jet recording head 220.

The alignment jig 400, which is assembled with the depressing unit 450 as described above so as to form a single integrated structure, is provided on the position move table (position move stage) 550. This configuration can move in a horizontal direction perpendicular to the optical axis L of the bifocal microscope 500. Accordingly, it is possible to position each of the alignment marks 22 corresponding to the ink-jet recording heads 220 together with the corresponding one of the reticule marks 401 on the optical axis L, which is achieved by moving the position move table 550 with the optical axis L being fixed. Note that through holes 551 are formed in the position move table 550 at areas/regions through each of which the optical axis L passes toward (and through) the mask 410. Such a structure secures an optical path that passes through the reticule mark 401 to reach the alignment mark 22.

The bifocal microscope 500 has on optical system 501 and another optical system 502. The optical system 501 and the optical system 502 share the optical axis L. The optical axis L passes through one surface of the mask 410 that is opposite to the other surface thereof where the other surface thereof faces toward the spacer jig 430, and further passes through the reticule mark 401 and the communicating hole 432, the latter of which is an unfilled/open space, to extend toward the alignment mark 22 (in the upright direction in the drawing) (The optical axis is oriented from a (bottom) face of the mask that is opposite to the spacer jig side thereof toward the alignment mark via the reticule mark and the space). The optical system 501 is configured so that it can focus on the reticule mark 401, whereas the optical system 502 is configured so that it can focus on the alignment mark 22.

An object lens 503 is housed in a lens barrel 504 with its optical axis L being directed toward the reticule mark 401 and the alignment mark 22. The lens barrel 504 is mounted on a microscope body chassis 505. Two beam splitters 506 and 507, two mirrors 508 and 509, and two focal lenses 510 and 511 are housed in the microscope body chassis 505.

The optical system 501 is made up of the beam splitter 506, the mirror 508, the focal lens 510, and the beam splitter 507. The optical path of the optical system 501, which is shown by an alternate long and short dash line in the drawing, is as follows. Firstly, the mirror 508 reflects light that has transmitted through the beam splitter 506. Then, the reflected light passes through the focal lens 510. Thereafter, the beam splitter 507 transmits the light so that it goes out of the microscope body chassis 505.

The optical system 502 is made up of the beam splitter 506, the focal lens 511, the mirror 509, and the beam splitter 507. The optical path of the optical system 502, which is shown by another alternate long and short dash line in the drawing, is as follows. Firstly, the beam splitter 506 reflects incoming light. Then, the reflected light passes through the focal lens 511. Thereafter, the mirror 509 reflects the light coming from the focal lens 511. Finally, the beam splitter 507 reflects the light coming from the mirror 509 so that it goes out of the microscope body chassis 505.

The CCD (camera) 520, which is image pickup means, acquires an image of the reticule mark 401 via the optical system 501 and an image of the alignment mark 22 via the optical system 502 concurrently, and then processes these acquired images for reproduction thereof. In order to obtain a focused image (i.e., in-focus image) of the reticule mark 401 on the CCD 520, the focal position of the focal lens 510 is adjusted. Similarly, in order to obtain a focused image of the alignment mark 22 on the CCD 520, the focal position of the focal lens 511 is adjusted. By this means, it is possible to obtain a sharp image with a focus being adjusted on the reticule mark 401, and independently thereof, another sharp image with a focus being adjusted on the alignment mark 22 on the CCD 520. Through adjustment of the position of the ink-jet recording head 220, alignment is performed so that these in-focus images overlap (in this context and throughout this specification, "superpose" or "lie at the same position with") each other.

Next, a method for aligning the ink-jet recording head 220 into a predetermined position by means of an alignment apparatus described above is explained below.

FIG. 7 is a bottom view that schematically illustrates an example of the ink-jet recording heads 220 during alignment processing, which is viewed from the bottom of the alignment jig 400.

Figure 7A:
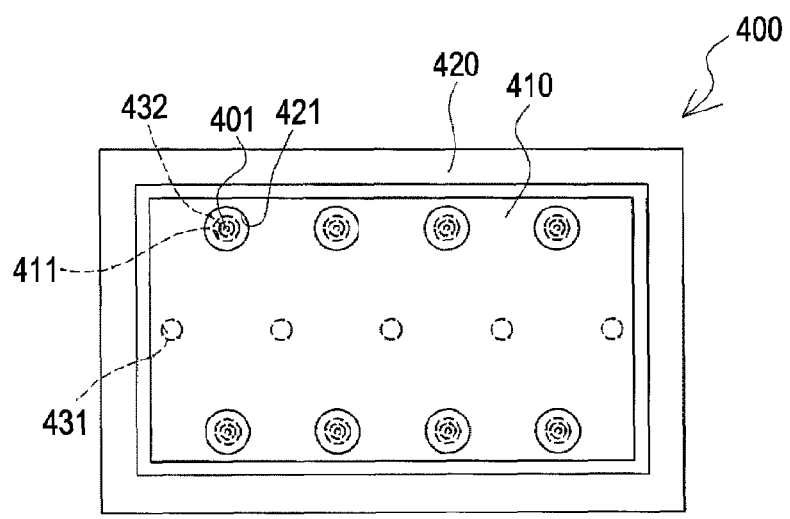
FIG. 7 is a bottom view that schematically illustrates an example of a positional determination method implemented by means of the alignment apparatus according to the first exemplary embodiment of the invention.

1) As illustrated in FIG. 7A, the reticule marks 401 are observed by means of the bifocal microscope 500 from the bottom of the alignment jig 400.

Figure 7B:
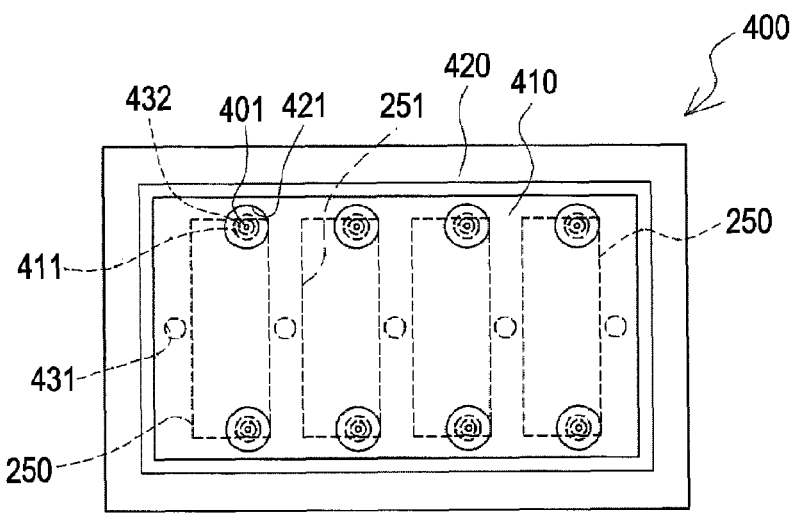

2) As illustrated in FIG. 7B, the holding plate 250 is placed on and fixed to the alignment jig 400. Specifically, the holding plate 250 is placed on and fixed to the upper surface of the spacer jig 430. The spacer jig 430 vacuum-chucks the holding plate 250 by means of the vacuuming chambers 431 for fixation thereof.

3) The focal lens 510 of the optical system 501 of the bifocal microscope 500 is adjusted so as to focus onto the reticule mark 401. Then, the in-focus image of the reticule mark 401 is acquired via the optical system 501 thereof by the CCD 520. In a similar manner, the focal lens 511 of the optical system 502 of the bifocal microscope 500 is adjusted so as to focus onto the alignment mark 22. Then, the in-focus image of the alignment mark 22 is acquired via the optical system 502 thereof by the CCD 520. As a result thereof, a sharp image with a focus being adjusted on the reticule mark 401, and independently thereof, another sharp image with a focus being adjusted on the alignment mark 22 are acquired by the CCD 520. As described above, the optical systems 501 and 502 can focus, independently of each other, on respective targets that share the optical axis L but have positions different from each other (specifically, the reticule mark 401 and the alignment mark 22). Therefore, it is possible to decrease the depth of field for each of the reticule mark 401 and the alignment mark 22 so as to obtain a sharp image for each thereof with a satisfactorily high magnification.

Figure 7C:
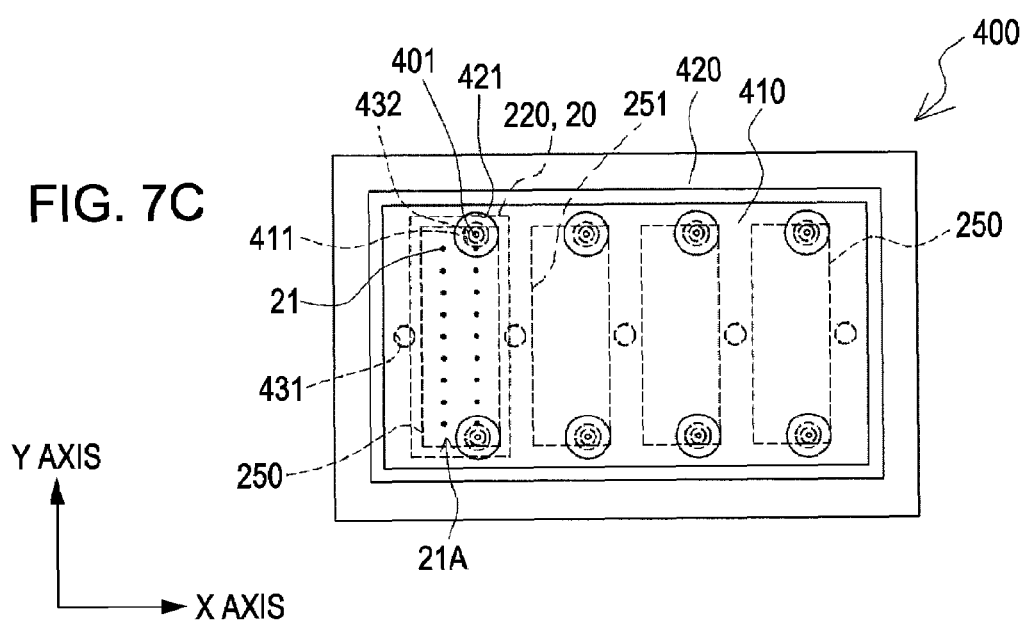

4) As illustrated in FIG. 7C, the ink-jet recording heads 220 and the holding plate 250 are fixed to each other by means of an adhesive. Specifically, on the basis of the images of the reticule mark 401 and the alignment mark 22 obtained in the previous step 3), the position of the ink-jet recording head 220 is adjusted so that the alignment mark 22 overlaps the reticule mark 401. Then, the ink-jet recording heads 220 and the holding plate 250 are fixed to each other by means of an adhesive.

Through the positional determination of the mask 410 and the ink-jet recording heads 220, it is possible to also (i.e., concurrently) determine the positions of the holding plate 250 and the ink-jet recording heads 220 in the same (i.e., single) alignment process as the first-mentioned positional determination (i.e., mask 410 and ink-jet recording head 220) because the holding plate 250 is supported by the alignment jig 400 with its position being fixed thereon.

It should be noted that the positional determination of the ink-jet recording heads 220 with respect to the holding plate 250 may be performed by an operator/observer who manually "fine-tunes" the positions thereof by means of a micrometer or any other alternative device not shown in the drawing while visually monitoring the images obtained by the CCD 520. Or, alternatively, the positional determination of the ink-jet recording heads 220 with respect to the holding plate 250 may be performed automatically as follows. That is, the images outputted from the CCD 520 are subjected to image processing. Then, on the basis of the image-processed output images, the above micrometer or any other alternative device is driven by a driving motor or the like so as to perform automatic positional determination.

5) The same process as the previous step 4) (illustrated in FIG. 7C) is repeated so as to perform positional determination of the plurality of the ink-jet recording heads 220 one after another with respect to the holding plate 250. Specifically, the position move table 550 is moved on the horizontal surface in the Y axis direction shown in FIG. 7C so as to perform the positional alignment of the other alignment mark 22 of the same (i.e., currently aligned) ink-jet recording head 220 and the corresponding reticule mark 401, whereas the position move table 550 is moved thereon in the X axis shown therein so as to perform the positional alignment of the alignment mark 22 of another adjacent ink-jet recording head 220 and the corresponding reticule mark 401, while keeping the optical axis L in a fixed state.

6) The depressing unit 450 applies a predetermined pressing force to the ink-jet recording heads 220 against the holding plate 250 so that they are bonded to each other through the hardening of an adhesive.

As described above, it is possible to perform positional determination of the holding plate 250 and the nozzle lines 21A with a high precision by aligning and then bonding the holding plate 250 and the plurality of ink-jet recording heads 220. In addition, it is possible to determine the relative positions of the nozzle lines 21A of one ink-jet recording head 220 and the nozzle lines 21A of another adjacent ink-jet recording head 220 with a high precision. Moreover, since the plurality of ink-jet recording heads 220 are bonded to the holding plate 250 made of a flat plate, it is possible to perform relative positional determination of the ink-jet recording heads 220 in an ink-drop-discharge direction just by bonding the ink-jet recording heads 220 to the holding plate 250. Therefore, it is not necessary to perform any special positional alignment in the ink-drop-discharge direction for the plurality of ink-jet recording heads 220. This makes it possible to prevent, without failure, the occurrence of any defective landing of ink drops at wrong positions.

In the present embodiment of the invention, the vertical position (i.e., height) of the reticule mark 401 is not the same as that of the alignment mark 22 because a space defined by the spacer jig 430 is left/interposed between the mask 410 in/on which the reticule marks 401 are printed/provided and the nozzle plate 20 in/through which the alignment marks 22 are provided. Notwithstanding the above, since two individual optical systems are provided, specifically, the optical system 501 for the reticule mark 401, and the optical system 502 for the alignment mark 22, it is possible to obtain a sharp image with a focus being adjusted on the reticule mark 401 by means of the optical system 501, and independently thereof, another sharp image with a focus being adjusted on the alignment mark 22 by means of the optical system 502. Thus, on the basis of these sharp in-focus images, it is possible to achieve a high precision in positional determination/alignment.

Second Embodiment

Figure 8:
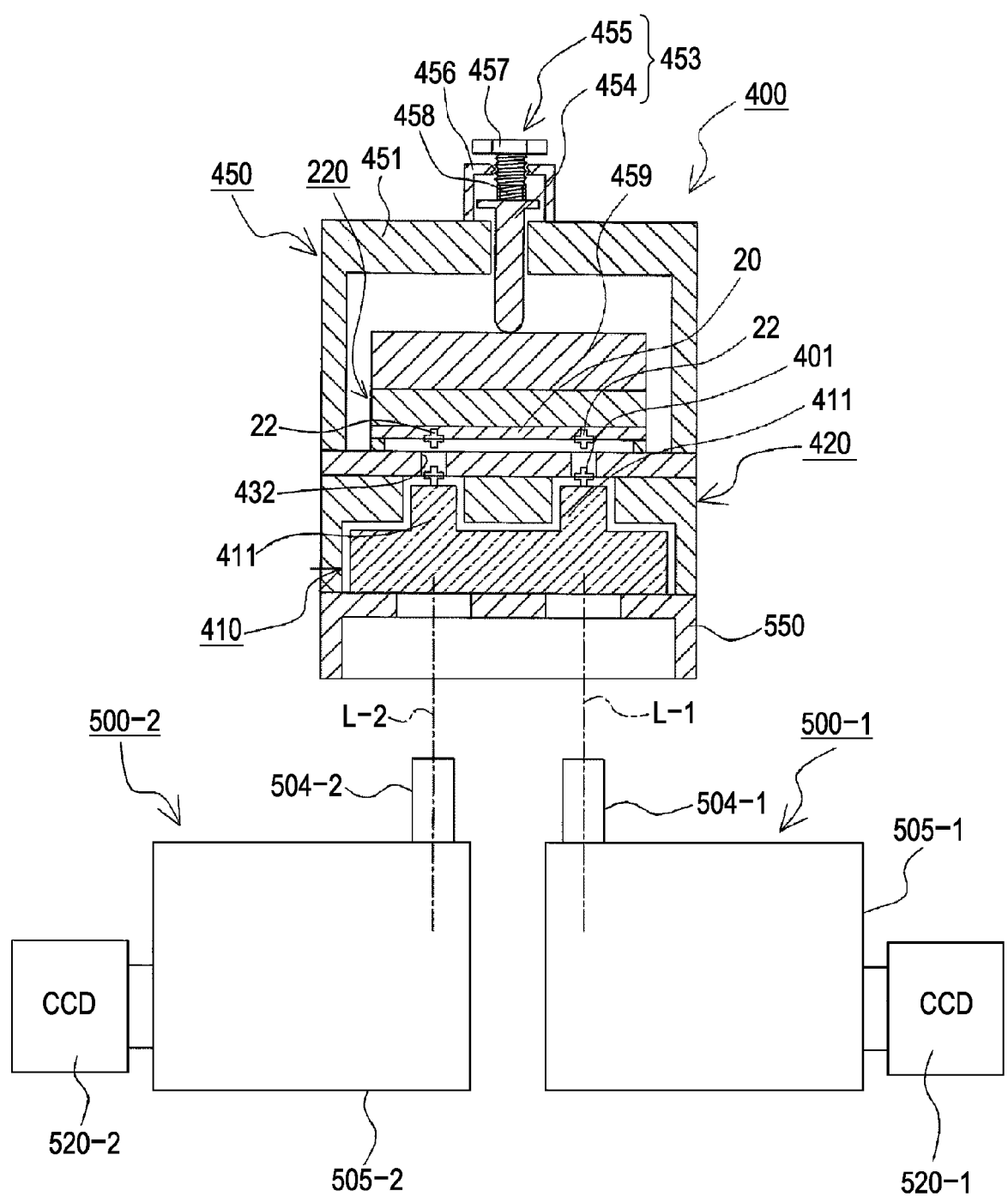
FIG. 8 is a sectional view that schematically illustrates an example of an alignment apparatus according to a second exemplary embodiment of the invention.

FIG. 8 is a sectional view that schematically illustrates an example of an alignment apparatus according to a second exemplary embodiment of the invention. It should be noted that FIG. 8 shows a cross section orthogonal to the section illustrated in FIG. 6, in other words, a crosscut or transverse section thereof.

As illustrated in FIG. 8, according to the present embodiment of the invention, a pair of bifocal microscopes 500-1 and 500-2 is provided. Specifically, these two bifocal microscopes 500-1 and 500-2 are provided in order to concurrently observe two alignment marks 22 one of which is provided at one end of a line (i.e., at a point extending outward from one end of the nozzle line 21A) and the other of which is provided at the other end thereof, viewed in the longitudinal direction of the nozzle plate 20 of one ink-jet recording head 220. It should be noted that each of the bifocal microscopes 500-1 and 500-2 has the same configuration as that of the bifocal microscopes 500 explained in the above first exemplary embodiment of the invention, except that the distance between an optical axis L-1 and an optical axis L-2 is in accordance with the distance between one of these two alignment marks 22 and the other.

Therefore, when the reticule marks 401 and the alignment marks 22 are aligned on the optical axes L-1 and L-2, respectively, the position of the ink-jet recording head 220 is determined with respect to the holding plate 250.

It should be noted that the fundamental procedures of positional determination are the same as those explained in the first exemplary embodiment of the invention, except that two bifocal microscopes 500-1 and 500-2 acquire the images of two alignment marks 22 and corresponding two reticule marks 401, respectively, for parallel processing thereof.

In the configurations of these two bifocal microscopes 500-1 and 500-2 shown in FIG. 8, each of components thereof which corresponds to a counterpart of the bifocal microscope 500 shown in FIG. 6 is denoted with a suffix "-1" or "-2" after the corresponding reference numeral.

Since the configurations of the alignment jig 400, the depressing unit 450, and the position move table 550 illustrated in FIG. 8 are completely the same as those explained in the first exemplary embodiment of the invention with reference to FIG. 6, the same reference numerals are used herein for the same components so as to omit any redundant explanation thereof.

According to the present embodiment of the invention, the alignment process completes for one ink-jet recording head 220 just by conducting a single execution of positional adjustment on the basis of a pair (i.e., two sets of) of reticule marks 401 and alignment marks 22. Therefore, in comparison with the first exemplary embodiment of the invention explained with reference to FIG. 6 where positional alignment is performed on the basis of one set of the reticule mark 401 and the alignment mark 22, the above configuration according to the second exemplary embodiment of the invention makes it possible to complete the positional alignment process more speedily.

In particular, in the first exemplary embodiment of the invention, positional alignment is performed for one ink-jet recording head 220 on the basis of one set of the reticule mark 401 and the alignment mark 22; and thereafter, positional alignment is continued to be performed therefor on the basis of the other set of the reticule mark 401 and the alignment mark 22. During such a series of processes, it is possible that the misalignment (i.e., disalignment/shift) of the first-aligned position could occur. Considering that such a misalignment could occur according to the first exemplary embodiment of the invention, the performance of positional alignment according to the second exemplary embodiment of the invention will be even better.

Third Embodiment

Figure 9:
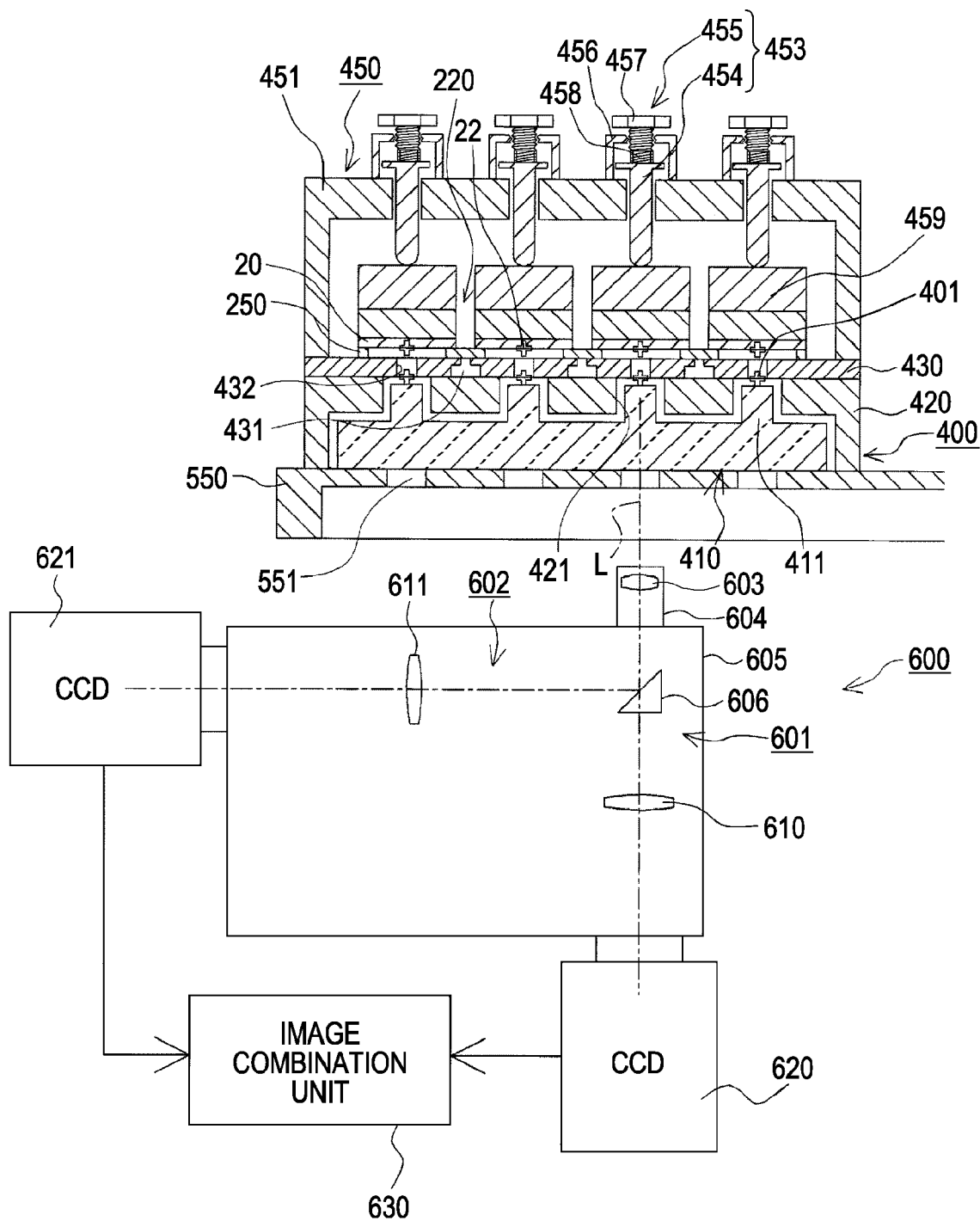
FIG. 9 is a sectional view that schematically illustrates an example of an alignment apparatus according to a third exemplary embodiment of the invention.

FIG. 9 is a sectional view that schematically illustrates an example of an alignment apparatus according to a third exemplary embodiment of the invention. As illustrated in FIG. 9, a bifocal microscope 600 according to the present embodiment of the invention is configured to allow the images of the reticule mark 401 and the alignment mark 22 to be acquired by two sets of CCDs 620 and 621 via two optical systems 601 and 602. Note that the optical system 601 and the optical system 602 share a single optical axis L. In the present embodiment of the invention, likewise the aforementioned configurations, the optical axis L passes through one surface of the mask 410 that is opposite to the other surface thereof facing toward the spacer jig 430, and further passes through the reticule mark 401 to extend toward the alignment mark 22 (The optical axis is oriented from a (bottom) face of the mask that is opposite to the spacer jig side thereof toward the reticule mark and the alignment mark). The optical system 601 is configured so that it can focus on the reticule mark 401, whereas the optical system 602 is configured so that it can focus on the alignment mark 22.

An object lens 603 is housed in a lens barrel 604 with its optical axis L being directed toward the reticule mark 401 and the alignment mark 22. The lens barrel 604 is mounted on a microscope body chassis 605. A beam splitter 606 and two focal lenses 610 and 611 are housed in the microscope body chassis 605.

The optical system 601 is made up of the beam splitter 606 and the focal lens 610. Light that has transmitted through the beam splitter 606 passes through the focal lens 610. The light that has passed through the focal lens 610 enters the CCD 620. On the other hand, the optical system 602 is made up of the beam splitter 606 and the focal lens 611. Light that has been reflected by the beam splitter 606 passes through the focal lens 611. The light that has passed through the focal lens 611 enters the CCD 621.

Each output from the CCDs 620 and 621, each of which constitutes image pickup means, is supplied to an image combination unit 630. At the image combination unit 630, the output from the CCD 620 is combined with the output from the CCD 621. The CCD 620 acquires the in-focus image of the reticule mark 401 through the focal adjustment performed by the focal lens 610. On the other hand, the CCD 621 acquires the in-focus image of the alignment mark 22 through the focal adjustment performed by the focal lens 611. Accordingly, the image combination unit 630 combines the focused image of the reticule mark 401 and the focused image of the alignment mark 22. Since the combined image is based on the sharp in-focus images of the reticule mark 401 and the alignment mark 22, it is possible to achieve a high precision in positional determination/alignment by adjusting the position of the ink-jet recording head 220 with respect to the holding plate 250 so that these in-focus images overlap each other.

Since the configurations of the alignment jig 400, the depressing unit 450, and the position move table 550 illustrated in FIG. 9 are completely the same as those explained in the first exemplary embodiment of the invention with reference to FIG. 6, the same reference numerals are used herein for the same components so as to omit any redundant explanation thereof.

Other Embodiments

Although exemplary embodiments of the invention are explained above, needless to say, the scope of the invention is in no case limited to any of the above specific embodiments/examples. For example, two bifocal microscopes 500-1 and 500-2 according to the second embodiment of the invention may be applied to the bifocal microscope 600 coupled to two CCDs according to the third embodiment of the invention. As another example of variations of the invention, a plurality of the bifocal microscopes 500, 500-1 and 500-2, or 600 may be provided such that the number of the bifocal microscopes agrees with that of ink-jet recording heads 220. In such a variation example, each of the plurality of bifocal microscopes 500, 500-1 and 500-2, or 600 corresponds to one of the plurality of ink-jet recording heads 220.

As the number of bifocal microscopes 500, 500-1 and 500-2, or 600 increases, positional alignment/determination will be performed more speedily.

In each of the exemplary embodiments of the invention described above, the depressing unit 450 is provided over the alignment jig 400. However, the invention is in no case limited to such a configuration. For example, the depressing unit may be omitted if an ultraviolet hardening-type adhesive is used for bonding the holding plate 250 with the ink-jet recording heads 220. That is, in a case where an ultraviolet hardening-type adhesive is used for bonding the holding plate 250 and the ink-jet recording heads 220, ultraviolet rays are irradiated with the holding plate 250 and the ink-jet recording heads 220 being in contact with each other after applying/coating such an adhesive onto the bonding surface of the holding plate 250. Through the irradiation of the ultraviolet rays thereon, the adhesive hardens to bond the holding plate 250 and the ink-jet recording heads 220 together. Therefore, this approach makes it possible to omit the depressing unit 450. It should be particularly mentioned that, unlike thermosetting adhesives, the ultraviolet hardening-type adhesives do not have to be hardened while applying a certain pressing force to the ink-jet recording heads 220 toward the holding plate 250. Therefore, if the ultraviolet hardening-type adhesive is adopted for fixation thereof, it is possible to bond the holding plate 250 and the ink-jet recording heads 220 together with a high positional precision because it is possible to avoid misalignment between the holding plate 250 and the ink-jet recording heads 220 caused by the application of the pressing force.

Since the bonding strength of the ultraviolet hardening-type adhesives is relatively weak, it is preferable that, as the first step, the holding plate 250 and the ink-jet recording heads 220 are bonded together by means of the ultraviolet hardening-type adhesive; and thereafter, the periphery of the corner portions, though not limited thereto, defined by the holding plate 250 and the ink-jet recording heads 220 may be further adhered by means of a thermosetting adhesive. By this means, it is possible to bond the holding plate 250 and the ink-jet recording heads 220 together featuring a high positional precision with an increased bonding strength, which enhances the reliability of the bonded structure.

In each of the exemplary embodiments of the invention described above, the holding plate 250 made of a flat plate is taken as an example of various kinds of fixation members for bonding the plurality of ink-jet recording heads 220. Notwithstanding the foregoing, the fixation member is in no case limited to the holding plate 250. As an example of alternative configurations, the plurality of ink-jet recording heads 220 may be directly bonded onto the cover head 240 after positional determination thereof. Even in a case where such an alternative configuration is adopted, it is still possible to perform positional determination with a high precision, and subsequent bonding thereof, by means of the alignment jig 400 described above.

In each of the exemplary embodiments of the invention described above, although a deflecting-vibration-type ink-jet recording head 220 is taken as an example for the purpose of explanation, the invention is in no case limited to such a specific configuration. Needless to say, the invention may be applied to various kinds of other head units that have a variety of alternative ink-jet recording heads. For example, the ink-jet recording head 220 may be configured as a vertical-vibration-type one which is made up of a lamination of a piezoelectric material and an electrode formation material deposited in an alternate manner so that it expands and contracts in its axial direction. As another example thereof, the ink-jet recording head 220 may be configured as a thermal-discharging-type one which discharges ink drops due to bubbles formed by heat generated by a heating element/device or the like.

In each of the exemplary embodiments of the invention described above, a head unit having ink-jet recording heads each of which discharges ink is taken as an example of various kinds of liquid ejecting heads, which are the targets of alignment according to the invention. Notwithstanding the foregoing, the invention is widely applicable to production of various kinds of liquid ejecting head units having a variety of liquid ejecting heads. Liquid ejecting heads to which the invention is applicable encompass a wide variety of heads; specifically, they include without any limitation thereto: a recording head that is used in an image recording apparatus such as a printer or the like, a color material ejection head that is used in the production of color filters for a liquid crystal display device or the like, an electrode material (i.e., conductive paste) ejection head that is used for electrode formation for an organic EL display device or a surface/plane emission display device (FED, field emission display) and the like, a living organic material ejection head that is used for production of biochips.

What is claimed is:

1. A liquid ejecting head alignment apparatus that is used for positional determination and adhesion of nozzle plates and a fixation member, each of the nozzle plates having nozzle openings through which each of a plurality of liquid ejecting heads ejects liquid and further having alignment marks for positional alignment, the fixation member holding the nozzle-plate side of the plurality of liquid ejecting heads, the liquid ejecting head alignment apparatus comprising:
   a mask made of a transparent material, the mask having reference marks each of which is aligned with the corresponding alignment mark;
   a spacer jig that is provided between the fixation member and the mask in such a manner that the reference marks and the alignment marks are opposed to each other with a space being left therebetween, one surface of the spacer jig being in contact with the fixation member; and
   a bifocal microscope having an optical axis and two optical systems that shares the optical axis, the optical axis being oriented from a face of the mask that is opposite to the spacer jig side thereof toward the alignment mark via the reference mark and the space, one of the optical systems being capable of focusing on the reference mark, and the other thereof being capable of focusing on the alignment mark.

2. The liquid ejecting head alignment apparatus according to claim 1,
   wherein a first optical path and a second optical path, which share the optical axis, branch from each other at a first beam splitter, and after reflection by respective mirrors, join into a single optical path at a second beam splitter to reach one image pickup unit that is provided as an external device; and
   two focal lenses are provided on the optical paths between the first beam splitter and the second beam splitter, one of the focal lenses being capable of adjusting the focal position of the reference mark, and the other thereof being capable of adjusting the focal position of the alignment mark.

3. The liquid ejecting head alignment apparatus according to claim 1,
   wherein a first optical path and a second optical path, which share the optical axis, branch from each other at a beam splitter, and the split first optical path reaches one of two image pickup units that are provided as external devices, whereas the split second optical path reaches the other thereof;
   two focal lenses are provided on the optical paths between the beam splitter and the image pickup units, one of the focal lenses being capable of adjusting the focal position of the reference mark, and the other thereof being capable of adjusting the focal position of the alignment mark; and
   the liquid ejecting head alignment apparatus further has an image combination section that combines images outputted from the two image pickup units.

4. The liquid ejecting head alignment apparatus according to claim 1, wherein the mask is provided with convex portions each of which protrudes along the optical axis toward the alignment mark; and the reference mark is provided on the upper surface of each of the convex portions.

5. The liquid ejecting head alignment apparatus according to claim 1,
wherein the bifocal microscope is constituted as a set of two microscopes, the two bifocal microscopes being provided in order to concurrently observe two alignment marks one of which is provided at one end of a line and the other of which is provided at
the other end thereof, viewed in the longitudinal direction of the nozzle plate of one ink-jet recording head; and
the distance between one and the other of the optical axes is in accordance with the distance between one and the other of the alignment marks for the concurrent observation.

6. The liquid ejecting head alignment apparatus according to claim 1,
wherein the bifocal microscope is constituted as a set of a plurality of microscopes, the plurality of bifocal microscopes being provided in order to concurrently observe the alignment marks which are provided respectively in the nozzle plates of the plurality of ink-jet recording heads; and
the distance between the optical axes is in accordance with the distance between the alignment marks of the nozzle plates adjacent to one another for the concurrent observation.

7. The liquid ejecting head alignment apparatus according to claim 1, wherein the mask and the spacer jig that supports the liquid ejecting heads are moved as one with the optical axis of the bifocal microscope being fixed so that the reference mark and the alignment mark, which are the targets of alignment, position on the optical axis or in the proximity thereof.

8. A liquid ejecting head alignment method that is used for positional determination and adhesion of nozzle plates and a fixation member, each of the nozzle plates having nozzle openings through which each of a plurality of liquid ejecting heads ejects liquid and further having alignment marks for positional alignment, the fixation member holding the nozzle-plate side of the plurality of liquid ejecting heads, the liquid ejecting head alignment method comprising the steps of:

positioning a mask and the liquid ejecting heads to be opposed to each other with a space being left therebetween, the mask being made of a transparent material, and the mask having reference marks each of which is aligned with the corresponding alignment mark;

orienting the optical axis of the bifocal microscope from the mask toward the alignment mark via the reference mark and the space so as to concurrently obtain the image of the reference mark and the image of the alignment mark; and performing the positional determination by aligning the image of the reference mark and the image of the alignment mark so that the image of the reference mark and the image of the alignment mark overlap each other, the images being obtained via two optical systems that shares the optical axis, one of the optical systems being capable of focusing on the reference mark, and the other thereof being capable of focusing on the alignment mark.

* * * * *